US009012593B2

(12) United States Patent
Chang et al.

(10) Patent No.: US 9,012,593 B2
(45) Date of Patent: Apr. 21, 2015

(54) METHOD FOR PREPARING AN AROMATIC LIQUID CRYSTAL POLYESTER RESIN AND METHOD FOR PREPARING A COMPOUND OF AROMATIC LIQUID CRYSTAL POLYESTER RESIN

(75) Inventors: Sun Hwa Chang, Daejeon (KR); Sang Mi Kang, Daejeon (KR); Dae Yeon Kim, Gangwon-do (KR); Jin Kyu Lee, Busan (KR)

(73) Assignee: Shenzhen Wote Advanced Materials Co., Ltd., Shenzhen (CN)

( * ) Notice: Subject to any disclaimer, the term of this patent is extended or adjusted under 35 U.S.C. 154(b) by 113 days.

(21) Appl. No.: 13/810,884

(22) PCT Filed: Jun. 14, 2011

(86) PCT No.: PCT/KR2011/004325
§ 371 (c)(1),
(2), (4) Date: Jan. 17, 2013

(87) PCT Pub. No.: WO2012/011664
PCT Pub. Date: Jan. 26, 2012

(65) Prior Publication Data
US 2013/0116397 A1    May 9, 2013

(30) Foreign Application Priority Data

Jul. 20, 2010    (KR) .................. 10-2010-0070083

(51) Int. Cl.
| C08G 63/02 | (2006.01) |
| C08G 63/06 | (2006.01) |
| C08G 63/19 | (2006.01) |
| C08G 63/685 | (2006.01) |
| C08G 63/78 | (2006.01) |
| C08L 67/03 | (2006.01) |
| C09K 19/38 | (2006.01) |
| C08G 64/00 | (2006.01) |

(52) U.S. Cl.
CPC ............ *C08G 63/065* (2013.01); *C08G 63/19* (2013.01); *C08G 63/685* (2013.01); *C08G 63/78* (2013.01); *C08L 67/03* (2013.01); *C09K 19/3809* (2013.01)

(58) Field of Classification Search
USPC .......................... 528/190, 193, 194, 196, 198
See application file for complete search history.

(56) References Cited

U.S. PATENT DOCUMENTS

| 6,774,203 B1 | 8/2004 | Fukute |
| 2005/0260372 A1 | 11/2005 | Matsuoka et al. |
| 2010/0203326 A1* | 8/2010 | Ok ............................... 428/337 |

FOREIGN PATENT DOCUMENTS

| EP | 1 645 584 A1 | 4/2006 |
| EP | 1 792 942 A1 | 6/2007 |
| JP | 2003-40989 A | 2/2003 |
| KR | 10-1998-064615 A | 10/1998 |
| KR | 10-2006-0052093 A | 5/2006 |
| KR | 10-2010-008005 A | 7/2010 |
| WO | 97/34964 A1 | 9/1997 |

OTHER PUBLICATIONS

"Synthesis of Acetaminophen," H N et al., Jan. 1, 2006, http://rene.souty.free.fr/IMG/pdf/ParacetamolProtocolFLORIDacetaminophen.pdf, retrieved from Internet on Dec. 12, 2013 (4 pages).
Extended European Search Report and European Search Opinion issued in corresponding European Application No. 11 809 791.4, dated Dec. 18, 2013 (5 pages).
Office Action issued in corresponding Chinese Application No. 201180035325.8 dated Dec. 20, 2013 and English translation of the same (10 pages).
International Search Report and Written Opinion from the International Bureau of WIPO for International Application No. PCT/KR2011/004325 dated Feb. 29, 2012 and English translation of the same (11 pages).

* cited by examiner

*Primary Examiner* — Terressa Boykin
(74) *Attorney, Agent, or Firm* — Osha Liang LLP

(57) ABSTRACT

Methods of preparing an aromatic liquid crystalline polyester resin and an aromatic liquid crystalline polyester resin compound are disclosed. A method of preparing an aromatic liquid crystalline polyester resin may include: acetylating a first monomer including an amino group by a reaction with a carboxylic acid anhydride; acetylating a second monomer including a hydroxyl group and not including an amino acid group with an additional carboxylic acid anhydride; and synthesizing an aromatic liquid crystalline polyester prepolymer by a condensation polymerization reaction of the acetylated first and second monomers with dicarboxylic acid. A method of preparing an aromatic liquid crystalline polyester resin compound may use the aromatic liquid crystalline polyester resin prepared according to the forgoing method.

12 Claims, No Drawings

METHOD FOR PREPARING AN AROMATIC LIQUID CRYSTAL POLYESTER RESIN AND METHOD FOR PREPARING A COMPOUND OF AROMATIC LIQUID CRYSTAL POLYESTER RESIN

CROSS-REFERENCE TO RELATED APPLICATIONS

This application is a National Phase Patent Application of International Patent Application Number PCT/KR2011/004325, filed on Jun. 14, 2011, which claims priority of Korean Patent Application Number 10-2010-0070083, filed Jul. 20, 2010, which are hereby incorporated herein by reference in their entirety.

FIELD OF THE INVENTION

The present invention relates to methods of preparing an aromatic liquid crystalline polyester resin and an aromatic liquid crystalline polyester resin compound. More particularly, the present invention relates to a method of preparing an aromatic liquid crystalline polyester resin that involves acetylating a first monomer including an amino acid, acetylating a second monomer including a hydroxyl group and not including an amino group, synthesizing an aromatic liquid crystalline polyester prepolymer by condensation polymerization of the acetylated first and second monomers with an aromatic dicarboxylic acid, and a method of preparing an aromatic liquid crystalline polyester resin compound using the aromatic liquid crystalline polyester resin prepared by the method.

BACKGROUND OF THE INVENTION

Aromatic liquid crystalline polyester resins have rigid molecules, which may be present in a liquid crystalline state without entanglement between molecules even in a molten state, and exhibit the behavior of molecular chains being oriented in a flow direction of the aromatic liquid crystalline polyester resin by shear force when being molded.

Due to having these characteristics aromatic liquid crystalline polyester resins have good flowability and resistance to heat, and thus, have been widely used as a material for vehicle parts, electric and electronic parts, and small and precise molded products.

With recent remarkable industrial advances, the uses of aromatic crystalline polyester resins tend to become more sophisticated and specialized. Aromatic liquid crystalline polyester resins have also good fluidity to be available in efficient and economical injection molding. Such aromatic liquid crystalline polyester resins are good, more specifically in heat resistance, resistance to hydrolysis and dimensional stability at high temperature, and mechanical strength, such as bending strength, tensile strength, impact strength, and thus, have extended uses as materials for coil bobbins which need to solder at high temperatures, connectors for electric and electronic parts, various vehicle parts, containers, films, and substrates.

Such aromatic liquid crystalline polyester resins may be prepared by condensation polymerization between at least two different monomers. The condensation polymerization reaction is conducted at a high temperature, thereby producing a gaseous byproduct, which may cause the surface of a reaction product to swell from foaming if not effectively removed. If the surface of the final product swells to an upper top of a reactor, a column for exhausting the gaseous byproduct may be clogged, thus not being able to remove the gaseous byproduct any longer. This may deteriorate physical characteristics of aromatic liquid crystalline polyester prepolymer and aromatic liquid crystalline polyester resins, and further cause a processing hindrance, which requires disassembling and cleaning of the reactor.

Once the gaseous byproduct causes foaming, whether it reaches the upper top of the reactor or not, and is not removed from the reaction product, the resulting synthesized aromatic polyester resin may not have uniform physical properties. As a result, aromatic polyester resin compounds and molded products manufactured from the aromatic polyester resin may have nonuniform, poor physical properties. In particular, the aromatic polyester resin compound may have reduced mechanical strength, and the molded products may undergo blistering when left in high-temperature air or liquid for a long time.

SUMMARY OF THE INVENTION

The present invention provides a method of preparing an aromatic liquid crystalline polyester resin, the method involving acetylating a first monomer including an amino group, acetylating a second monomer including a hydroxyl group and not including an amino group, and synthesizing an aromatic liquid crystalline polyester prepolymer by condensation polymerization of the acetylated first and second monomers with aromatic dicarboxylic acid.

The present invention provides a method of preparing an aromatic liquid crystalline polyester resin compound using the aromatic liquid crystalline polyester resin prepared by the foregoing method.

According to an aspect of the present invention, there is provided a method of preparing an aromatic liquid crystalline polyester resin, the method including: acetylating a first monomer including an amino group by a reaction with a carboxylic acid anhydride; acetylating a second monomer including a hydroxyl group and not including an amino acid group with an additional carboxylic acid anhydride; and synthesizing an aromatic liquid crystalline polyester prepolymer by a condensation polymerization reaction of the acetylated first and second monomers with dicarboxylic acid.

The method may further include synthesizing the aromatic liquid crystalline polyester resin by a solid-phase condensation polymerization of the synthesized aromatic liquid crystalline polyester prepolymer.

An amount of the carboxylic acid anhydride may be from about 2.0 to about 4.0 parts by mole based on a part by mole of a total of the amino group and a hydroxyl group of the first monomer.

The first monomer may include at least one compound selected from the group consisting of aromatic hydroxylamine, aliphatic hydroxylamine, aromatic diamine, aliphatic diamine, aromatic amino carboxylic acid, and aliphatic amino carboxylic acid.

The aromatic hydroxylamine may include at least one compound selected from the group consisting of 3-aminophenol, 4-aminophenol, and 2-amino-6-naphthol; the aliphatic hydroxylamine may include at least one compound selected from the group consisting of 3-aminopropanol, 4-aminobutanol, and 5-aminopentanol; the aromatic diamine may include at least one compound selected from the group consisting of 1,4-phenylene diamine, 1,3-phenylene diamine, and 2,6-naphthalene diamine; the aliphatic diamine may include at least one compound selected from the group consisting of 1,4-diaminobutane, 1,5-diaminopentane, and 1,6-diaminohexane; the aromatic amino carboxylic acid may include at least one compound selected from the group consisting of 4-aminobenzoic acid, 2-amino-naphthalene-6-carboxylic acid, and 4-amino-biphenyl-4-carboxylic acid; and the aliphatic amino carboxylic acid may include at least one compound selected from the group consisting of 4-aminobutanoic acid, 5-aminopentanoic acid, and 6-aminohexanoic acid.

The second monomer may include at least one compound selected from the group consisting of aromatic diol, aromatic hydroxy carboxylic acid, and aliphatic hydroxy carboxylic acid.

The aromatic diol may include at least one compound selected from the group consisting of biphenol, hydroquinone, 1,4-dihydroxy naphthalene, and 2,6-dihydroxy naphthalene; and the aromatic hydroxy carboxylic acid may include at least one compound selected from parahydroxy benzoic acid and 6-hydroxy-2-naphthoic acid.

The carboxylic acid anhydride and the additional carboxylic acid anhydride may each include at least one compound selected from the group consisting of acetic anhydride, diphenyl carbonate, and benzyl acetate.

The dicarboxylic acid may include at least one compound selected from the group consisting of isophthalic acid, naphthalene dicarboxylic acid, terephthalic acid, 1,3-propanedicarboxylic acid, 1,4-butanedicarboxylic acid, and 1,5-pentanedicarboxylic acid.

The acetylating of the first monomer and the acetylating of the second monomer may be each independently performed at a temperature of about 140° C. to about 160° C. for about 1 to about 3 hours.

The synthesizing of the aromatic liquid crystalline polyester prepolymer may be performed at a temperature of about 310° C. to about 340° C. for about 5 to about 8 hours.

The first monomer, the second monomer, and the dicarboxylic acid may be all aromatic compounds.

According to another aspect of the present invention, there is provided a method of preparing an aromatic liquid crystalline polyester resin compound using the aromatic liquid crystalline polyester resin prepared according to any one of the forgoing methods.

In the methods of preparing an aromatic liquid crystalline polyester resin, according to the above-described embodiments, during a high-temperature condensation polymerization reaction a less amount of gaseous byproducts may be generated, thus producing less bubbles on the surface of a final product. As a result, clogging of a gaseous byproduct discharge column and incorporation of the byproduct into the final product may unlikely occur, thus preventing physical property deteriorations in resin itself and molded products manufactured therefrom. Accordingly, aromatic liquid crystalline polyester resins with uniform physical properties overall, and resin compounds and molded products with improved mechanical strength (in particular, bending characteristics) and heat-resistance may be prepared. The molded products may not undergo blistering from a high-temperature heat-treatment.

DETAILED DESCRIPTION OF THE PREFERRED EMBODIMENTS

Hereinafter, according to embodiments of the present invention, methods of preparing an aromatic liquid crystalline polyester resin and methods of preparing an aromatic liquid crystalline polyester resin compound using the aromatic liquid crystalline polyester resin will be described in detail.

According to an aspect of the present invention, a method of preparing an aromatic liquid crystalline polyester resin includes acetylating a first monomer including an amino group by a reaction with a carboxylic acid anhydride (first monomer acetylation step); acetylating a second monomer including a hydroxyl group and not including an amino group by a reaction with an additional carboxylic acid anhydride (second monomer acetylation step); and synthesizing an aromatic liquid crystalline polyester prepolymer by condensation, polymerization of the acetylated first and second monomers with dicarboxylic acid.

In the acetylating of the first monomer, an acetyl group ($—COCH_3$) is introduced into the amino group ($—NH_2$) of the first monomer, thereby producing an acetylamino group ($—NHCOCH_3$) and an acetic acid byproduct. The acetic acid byproduct, which is a gaseous form, may be removed from the reaction product. By using the first monomer including an amino group, an aromatic liquid crystalline polyester resin, an aromatic liquid crystalline polyester resin compound, and a molded product that have strong mechanical strength (more particularly, in bending characteristics) may be manufactured.

The acetylating of the first monomer is to control the overall condensation polymerization rate by prior acetylation of the highly reactive amino acid of the first monomer. Due to being more reactive than hydroxyl groups, amino groups may be acetylated at low temperatures. In the first monomer acetylation step, prior to being acetylated, the amino group may react with the acetic acid byproduct, thereby forming ammonium ions, which may serve as a surfactant and create foams on the reaction product when in its high concentration. If the first monomer and the second monomer are acetylated at the same time, remarkably increased amount of acetic acid is produced, and thus the amino group of the first monomer is used for the reaction with the acetic acid, rather than for the aceylation, thereby resulting in a larger amount of ammonium ions. This may cause generation of a large amount of foam on the surface of the reaction product during the subsequent condensation polymerization. To allow an acetylated amino group derived from the first monomer to participate in the condensation polymerization reaction, the amino group of the first monomer is primarily acetylated under the conditions for minimizing foaming, and, the second monomer may be secondarily acetylated. As a result, a less amount of foam is created on the surface of the reaction product of the condensation polymerization, thereby preventing clogging of the column for exhausting byproducts and resulting in a reduced amount of the gaseous byproduct in the reaction product. Therefore, an aromatic liquid crystalline polyester resin having uniform and good physical properties overall, an aromatic liquid crystalline polyester resin compound, and a molded product thereof may be manufactured.

In the acetylating of the first monomer, an amount of the carboxylic acid anhydride may be from about 2.0 to about 4.0 parts by mole based on 1 part by mole of a total of the amino group and hydroxyl group of the first monomer. When the amount of the carboxylic acid anhydride used is within this range, acetylation of the first monomer may be sufficient not to cause browning of the synthesized resin, and less amount of the carboxylic acid anhydride remains unreacted, thus being easily removable.

The acetylating of the first monomer may be performed at a temperature of about 140° C. to about 160° C. for about 1 to 3 hours. When the acetylation temperature and time are within these ranges, acetylation of the amino group and hydroxyl group of the first monomer is sufficient to allow subsequent condensation polymerization at low temperatures. As a result, the synthesized aromatic liquid crystalline polyester prepolymer may not suffer from either deterioration or subsequent browning.

The first monomer may include at least one compound selected from the group consisting of aromatic hydroxylamine, aliphatic hydroxylamine, aromatic diamine, aliphatic diamine, aromatic amino carboxylic acid, and aliphatic amino carboxylic acid.

The aromatic hydroxylamine may include at least one compound selected from the group consisting of 3-aminophenol, 4-aminophenol, and 2-amino-6-naphthol.

The aliphatic hydroxylamine may include at least one compound selected from the group consisting of 3-aminopropanol, 4-aminobutanol, and 5-aminopentanol.

The aromatic diamine may include at least one compound selected from the group consisting of 1,4-phenylene diamine, 1,3-phenylene diamine, and 2,6-naphthalene diamine.

The aliphatic diamine may include at least one compound selected from the group consisting of 1,4-diaminobutane, 1,5-diaminopentane, and 1,6-diaminohexane.

The aromatic amino carboxylic acid may include at least one compound selected from the group consisting of 4-aminobenzoic acid, 2-amino-naphthalene-6-carboxylic acid, and 4-amino-biphenyl-4-carboxylic acid.

The aliphatic amino carboxylic acid may include at least one compound selected from the group consisting of 4-aminobutanoic acid, 5-aminopentanoic acid, and 6-aminohexanoic acid.

The carboxylic acid anhydride may include at least one compound selected from the group consisting of acetic anhydride, diphenyl carbonate, and benzyl acetate.

In the acetylating of the second monomer, an acetyl group (—COCH$_3$) is introduced into the hydroxyl group (—OH) of the second monomer, thereby producing an acetyloxy group (—OCOCH$_3$) and an acetic acid byproduct gas. The acetic acid byproduct gas may be easily removed from the reaction product.

In the acetylating of the second monomer, an amount of the additional carboxylic acid anhydride may be from about 1.0 to about 1.1 parts by mole based on 1 part by mole of the hydroxyl group of the second monomer. When the amount of the additional carboxylic acid anhydride used is within this range, acetylation of the second monomer may be sufficient not to cause browning of a synthesized aromatic liquid crystalline polyester resin, and a less amount of the additional carboxylic acid anhydride remains unreacted, thus being easily removable.

The acetylating of the second monomer may be performed at a temperature of about 140° C. to about 160° C. for about 1 to 3 hours. When the acetylation temperature and time are within these ranges, acetylation of the hydroxyl group of the second monomer is sufficient to allow subsequent condensation polymerization at low temperatures. As a result, the synthesized aromatic liquid crystalline polyester prepolymer may not suffer from either deterioration or subsequent browning.

The second monomer may include at least one compound selected from the group consisting of aromatic diol, aromatic hydroxy carboxylic acid, and aliphatic hydroxy carboxylic acid.

The aromatic diol may include at least one compound selected from the group consisting of biphenol, hydroquinone, 1,4-dihydroxy naphthalene, and 2,6-dihydroxy naphthalene.

The aromatic hydroxy carboxylic acid may include at least one compound selected from parahydroxy benzoic acid and 6-hydroxy-2-naphthoic acid. The additional carboxylic acid anhydride may include at least one compound selected from the group consisting of acetic anhydride, diphenyl carbonate, and benzyl acetate.

The synthesizing of the aromatic liquid crystalline polyester prepolymer by the condensation polymerization of the acetylated first and second monomers with dicarboxylic acid may be performed by solution condensation polymerization or bulk condensation polymerization.

The dicarboxylic acid may include at least one compound selected from the group consisting of isophthalic acid, naphthalene dicarboxylic acid, terephthalic acid, 1,3-propanedicarboxylic acid, 1,4-butanedicarboxylic acid, and 1,5-pentanedicarboxylic acid.

In the synthesizing of the aromatic liquid crystalline polyester prepolymer, a metal acetate may be further used as a catalyst for facilitating the reaction. The metal acetate catalyst may include at least one selected from the group consisting of magnesium acetate, potassium acetate, calcium acetate, zinc acetate, manganese acetate, lead acetate, antimony acetate, and cobalt acetate. An amount of the metal acetate catalyst may be, for example, 0.10 parts by weight or less based on 100 parts by weight of a total amount of the first monomer and the second monomer.

The synthesizing of the aromatic liquid crystalline polyester prepolymer may be performed at a temperature of about 310° C. to about 340° C. for about 5 to about 8 hours. When the synthesis temperature and time are within these ranges, a processing hindrance to discharging of byproducts after the condensation polymerization reaction does not occur, and an aromatic liquid crystalline polyester prepolymer having physical properties suitable for a solid-phase condensation polymerization reaction may be obtained.

The method of preparing an aromatic liquid crystalline polyester resin may further include solid-phase condensation polymerization of the aromatic liquid crystalline polyester prepolymer to synthesize the aromatic liquid crystalline polyester resin. For the solid-phase condensation polymerization reaction, the aromatic liquid crystalline polyester prepolymer needs to be appropriately heated, for example, using a heating plate, hot air, high-temperature fluid, or the like. Byproducts from the solid-phase condensation polymerization reaction may be removed by purging with an inert gas or by evacuation.

The aromatic liquid crystalline polyester resin prepared using the method may include various repeating units in chains thereof, such as the following repeating units:

(1) Repeating unit derived from aromatic hydroxylamine:

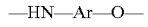

(2) Repeating unit derived from aromatic diamine:

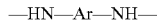

(3) Repeating unit derived from aromatic amino carboxylic acid:

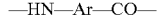

(4) Repeating unit derived from aromatic diol:

(5) Repeating unit derived from aromatic hydroxy carboxylic acid:

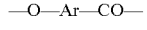

(6) Repeating unit derived from aromatic dicarboxylic acid:

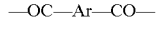

In the formulae defined above, Ar may be phenylene, biphenylene, naphthalene, an aromatic compound in which two phenylenes are bonded to each other via a carbon or non-carbon element, or an aromatic compound selected from the group consisting of phenylene, biphenylene, naphthalene, or two phenylene bonded to each other by carbon or a non-carbon element in which at least one hydrogen atom is substituted with other elements.

Another aspect of the present invention provides a method of preparing an aromatic liquid crystalline polyester resin compound using the aromatic liquid crystalline polyester resin prepared by the above-described method.

The method of preparing an aromatic liquid crystalline polyester resin compound may include synthesizing the aromatic liquid crystalline polyester resin according to the above-described method, and melt-kneading the synthesized aromatic liquid crystalline polyester resin and an additive. The melt-kneading may be performed using a batch type kneader, a twin-screw extruder, a mixing roll, or the like. To smoothly perform the melt-kneading, a lubricant may be used during the melt-kneading.

The additive may include at least one selected from the group consisting of inorganic additives and organic additives.

Examples of the inorganic additive include glass fiber, talc, calcium carbonate, mica, and mixtures of at least two thereof. The organic additive may be carbon fiber.

The first monomer, second monomer, and dicarboxylic acid may be all aromatic compounds. In this case, a wholly aromatic liquid crystalline polyester prepolymer, a wholly aromatic liquid crystalline polyester resin, a wholly aromatic liquid crystalline polyester resin compound, and a molded product thereof may be obtained in the above-described steps of the method.

Hereinafter, one or more embodiments of the present invention will be described in more detail with reference to the following examples. However, these examples are not intended to limit the scope of the one or more embodiments of the present invention.

EXAMPLES

Example 1

Preparation of Wholly Aromatic Liquid Crystalline Polyester Resin (1) and Resin Compound (1) Thereof (First Acetylation Reaction)

After 131 g (1.2 mole) of 4-aminophenol was put into a 10-L reactor equipped with a stirrer, a nitrogen gas inlet, a thermometer, and a reflux condenser, a nitrogen gas was introduced into the reactor to create an inert atmosphere, and 0.3 g of calcium acetate was further added into the reactor along with 490 g (4.8 moles) of acetic anhydride to facilitate an acetylation reaction and a subsequent condensation polymerization reaction. Afterwards, the temperature of the reactor was raised to about 150° C. over 30 minutes, followed by a reflux at the same temperature for about 1 hour.

(Second Acetylation Reaction, Prepolymer and Resin Synthesis Reactions, and Resin Compound Preparation)

Subsequently, 2,486 g (18.0 moles) of parahydroxy benzoic acid, 226 g (1.2 moles) of 6-hydroxy-2-naphthoic acid, 782 g (4.2 moles) of biphenol, and 897 g (5.4 moles) of terephthalic acid were further added to the reactor, followed by an addition of 2,997 g (29.4 moles) of acetic anhydride. Afterwards, the temperature of the reactor was raised to 150° C. over 30 minutes, followed by a reflux at the same temperature for 3 hours. Then, while removing the acetic acid byproduct, the temperature was raised to 330° C. over about 6 hours to allow a condensation polymerization reaction of the monomers, thereby preparing a wholly aromatic liquid crystalline polyester prepolymer. The wholly aromatic liquid polyester prepolymer was recovered from the reactor, and cooled to solidify. Afterwards, the wholly aromatic liquid crystalline polyester prepolymer was pulverized to an average particle diameter of 1 mm using a pulverizer. After 3,000 g of the wholly aromatic liquid crystalline polyester prepolymer having the uniform particle size was put into a 100-L rotary kiln reactor, while continuously flowing a nitrogen gas into the reactor at about 1 $Nm^3$/hr, the temperature was raised to 200° C. at which the weight loss is initiated, over 1 hour, then up to 290° C. over 5 hours, and maintained for 2 hours, thereby preparing the wholly aromatic liquid crystalline polyester resin (1). After cooling the reactor to room temperature over 1 hour, the wholly aromatic liquid crystalline polyester resin (1) was recovered from the reactor.

Afterwards, the prepared wholly aromatic liquid crystalline polyester resin (1), glass fiber (pulverized glass fiber having a diameter of 10 μm and an average length of 150 μm), and talc (having a diameter of 2 μm to 15 μm) were mixed in a ratio of 65:10:25 by weight, and further melt-kneaded using a twin-screw extruder (L/D: 40, diameter: 20 mm), thereby preparing a wholly aromatic liquid crystalline polyester resin compound (1). In the preparation of the wholly aromatic liquid crystalline polyester resin compound (1), the twin-screw extruder was evacuated to remove byproducts.

Example 2

Preparation of Wholly Aromatic Liquid Crystalline Polyester Resin (2) and Resin Compound (2) Thereof A wholly aromatic liquid crystalline polyester resin (2) and a resin compound (2) thereof were prepared in the same manner as in Example 1, except that in the first to acetylation reaction, the amount of the acetic anhydride was changed to 980 g (9.6 moles).

Comparative Example 1

Preparation of Wholly Aromatic Liquid Crystalline Polyester Resin (3) and Resin Compound (3) Thereof A wholly aromatic liquid crystalline polyester resin (3) and a resin compound (3) thereof were prepared in the same manner as in Example 1, except that the first acetylation reaction was omitted, and 4-aminophenol and all of the other monomers were put into the reactor at the same time for acetylation and subsequent procedures. The amount of added acetic anhydride was about 3,247 g (31.8 moles).

Evaluation Example

A melt viscosity and melting temperature of each wholly aromatic liquid crystalline polyester resin prepared in Examples 1-2 and Comparative Example 1; a melt viscosity of each wholly aromatic liquid crystalline polyester resin compound prepared in Examples 1 and 2 and Comparative Example 1; and tensile strength, flexural strength, impact strength, heat-resistance temperature, whether blistering occurred were measured or evaluated for each molded product of the wholly aromatic liquid crystalline polyester resin compounds. The results are shown in Table 1 below. Furthermore, it was observed whether any processing hindrance such as bubbling up to an upper edge of the reactor occurred. The results are shown in Table 1 below.

(1) Melt Viscosity Measurement Method

A viscosity was measured using a melt viscosity measuring device (RH2000, available from Rosand Inc.) having a 1.0 mm×32 mm capillary at temperatures (melting temperature+ 10° C.) and a shear rate of about 100/s, which was called "melt viscosity".

(2) Melting Temperature Measurement Method

Melting temperature was measured using a differential scanning calorimeter (TA Instruments Inc., DSC 2910). A temperature at which an endothermic peak was observed while a resin sample was heated from 40° C. at a rate of 20° C./min was determined as a first melting point (Tm1). While the resin sample was maintained at a temperature 30° C. higher than Tm1 for 10 minutes, cooled to 40° C. at a rate of 10° C./min, and heated at a rate of 20° C./min, a temperature at which the endothermic peak was observed was determined as melting temperature.

(3) Measurement Methods of Tensile Strength, Flexural Strength, Impact Strength, and Heat-Resistance Temperature After a sample of each wholly aromatic liquid crystalline polyester resin compound was prepared using an extruder (S-2000i 50B, available from FANUC Co. Ltd), cooled to room temperature, and then left for about 5 hours, a tensile strength (ASTM D638), flexural strength (ASTM D790), impact strength (ASTM D256), and heat-resistance temperature (ASTM D648) were measured.

(4) Method of Evaluating the Occurrence of a Blister

A bent sample of each wholly aromatic liquid crystalline polyester resin compound was prepared using an extruder (S-2000i 50B, available from FANUC Co. Ltd.). After each sample was heat-treated at 270° C. for 5 minutes, whether or not a blister occurred on the surface of each heat-treated sample was evaluated.

polyester resin, no such a processing hindrance as described above occurred in Examples 1 and 2, but it occurred in Comparative Example 1.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing an aromatic liquid crystalline polyester amide resin, the method comprising:
   acetylating a first monomer including an amino group by a reaction with a carboxylic acid anhydride;
   acetylating a second monomer including a hydroxyl group and not including an amino acid group with an additional carboxylic acid anhydride; and
   synthesizing an aromatic liquid crystalline polyester amide prepolymer by a condensation polymerization reaction of the acetylated first and second monomers with dicarboxylic acid.

2. The method of claim 1, further comprising synthesizing the aromatic liquid crystalline polyester amide resin by a solid-phase condensation polymerization of the synthesized aromatic liquid crystalline polyester amide prepolymer.

3. The method of claim 1, wherein an amount of the carboxylic acid anhydride is from about 2.0 to about 4.0 parts by mole based on a part by mole of a total of the amino group and a hydroxyl group of the first monomer.

4. The method of claim 1, wherein the first monomer is selected from the group consisting of aromatic hydroxylamine, aliphatic hydroxylamine, aromatic diamine, aliphatic diamine, aromatic amino carboxylic acid, and aliphatic amino carboxylic acid.

5. The method of claim 4, wherein the aromatic hydroxylamine is selected from the group consisting of 3-aminophenol, 4-aminophenol, and 2-amino-6-naphthol; the aliphatic

TABLE 1

| | Physical Properties of Resin | | Melt | Physical Properties of Molded Product | | | | |
|---|---|---|---|---|---|---|---|---|
| | Processing hindrance | Melt viscosity (poise) | Melting temperature (° C.) | Viscosity of Resin Compound (poise) | Tensile Strength (MPa) | Flexural Strength (MPa) | Impact Strength (J/m) | Heat-resistance Temperature (° C.) | Occurrence of blister |
| Example 1 | None | 390 | 334 | 360 | 115 | 142 | 850 | 265 | x (not occurred) |
| Example 2 | None | 380 | 334 | 355 | 117 | 145 | 880 | 267 | x (not occurred) |
| Comparative Example 1 | Occurred | 180 | 323 | 95 | 102 | 118 | 480 | 254 | o (occurred) |

Referring to Table 1 above, the wholly aromatic liquid crystalline polyester resins and resin compounds of Examples 1 and 2 are found to be better in all physical properties than the wholly aromatic liquid crystalline polyester resin and resin compound of Comparative Example 1. The molded products manufactured from the wholly aromatic liquid crystalline polyester resin compounds of Examples 1 and 2 are found to be better in all physical properties than the molded product manufactured from the wholly aromatic liquid crystalline polyester resin compound of Comparative Example 1. During the preparation of each wholly aromatic liquid crystalline hydroxylamine is selected from the group consisting of 3-aminopropanol, 4-aminobutanol, and 5-aminopentanol; the aromatic diamine is selected from the group consisting of 1,4-phenylene diamine, 1,3-phenylene diamine, and 2,6-naphthalene diamine; the aliphatic diamine is selected from the group consisting of 1,4-diaminobutane, 1,5-diaminopentane, and 1,6-diaminohexane; the aromatic amino carboxylic acid is selected from the group consisting of 4-aminobenzoic acid, 2-amino-naphthalene-6-carboxylic acid, and 4-amino-biphenyl-4-carboxylic acid; and the aliphatic amino carboxylic acid is selected from the group consisting of 4-aminobutanoic acid, 5-aminopentanoic acid, and 6-aminohexanoic acid.

6. The method of claim 1, wherein the second monomer is selected from the group consisting of aromatic diol, aromatic hydroxy carboxylic acid, and aliphatic hydroxy carboxylic acid.

7. The method of claim 6, wherein the aromatic diol is selected from the group consisting of biphenol, hydroquinone, 1,4-dihydroxy naphthalene, and 2,6-dihydroxy naphthalene; and the aromatic hydroxy carboxylic acid is selected from parahydroxy benzoic acid and 6-hydroxy-2-naphthoic acid.

8. The method of claim 1, wherein each of the carboxylic acid anhydride and the additional carboxylic acid anhydride is selected from the group consisting of acetic anhydride, diphenyl carbonate, and benzyl acetate.

9. The method of claim 1, wherein the dicarboxylic acid is selected from the group consisting of isophthalic acid, naphthalene dicarboxylic acid, terephthalic acid, 1,3-propanedicarboxylic acid, 1,4-butanedicarboxylic acid, and 1,5-pentanedicarboxylic acid.

10. The method of claim 1, wherein the acetylating of the first monomer and the acetylating of the second monomer are each independently performed at a temperature of about 140° C. to about 160° C. for about 1 to about 3 hours.

11. The method of claim 1, wherein the synthesizing of the aromatic liquid crystalline polyester amide prepolymer is performed at a temperature of about 310° C. to about 340° C. for about 5 to about 8 hours.

12. The method of claim 1, wherein the first monomer, the second monomer, and the dicarboxylic acid are all aromatic compounds.

* * * * *